B. F. SEYMOUR.
GEARING.
APPLICATION FILED OCT. 1, 1917.
1,277,652.
Patented Sept. 3, 1918.
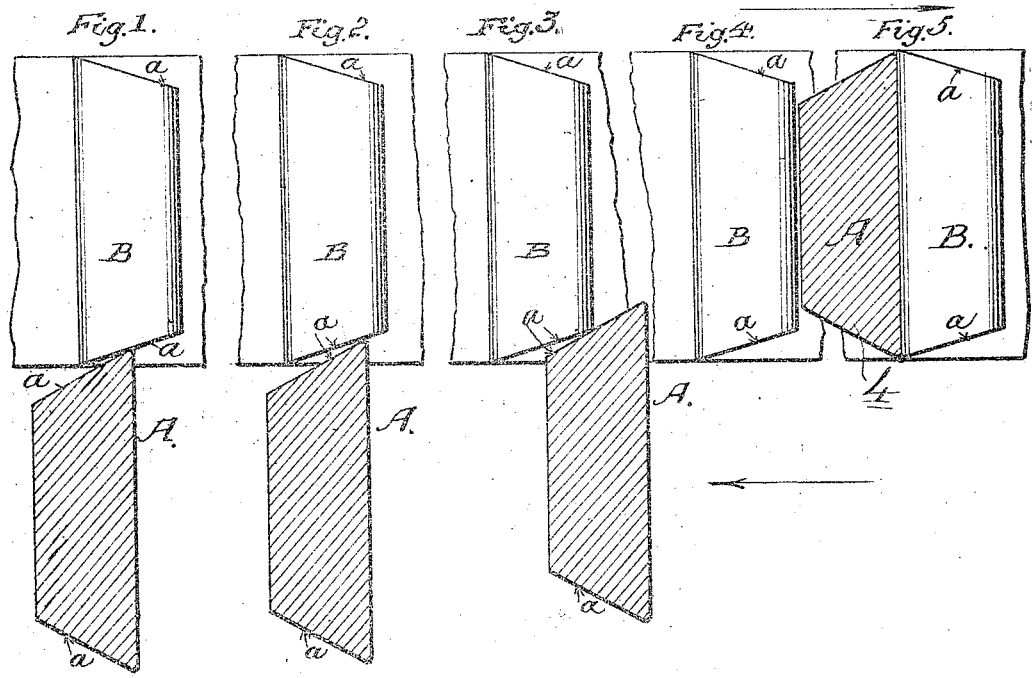
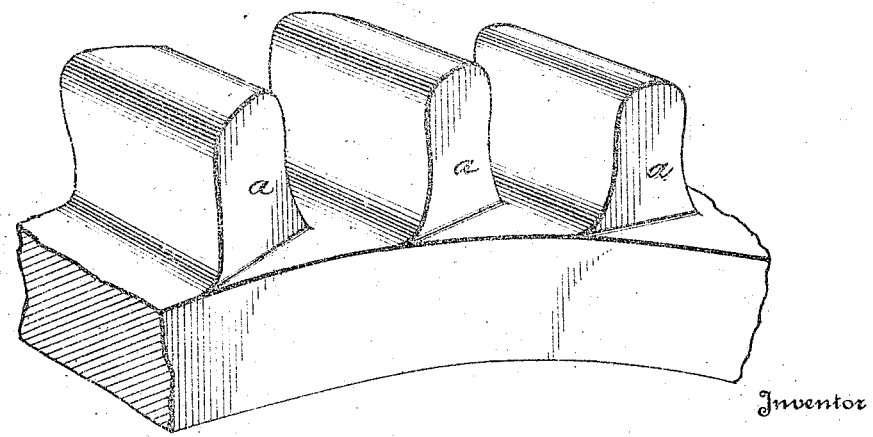
Inventor
Benjamin F. Seymour.
By T. Walter Fowler
Attorney

UNITED STATES PATENT OFFICE.

BENJAMIN F. SEYMOUR, OF DENVER, COLORADO.

GEARING.

1,277,652.

Specification of Letters Patent. Patented Sept. 3, 1918.

Application filed October 1, 1917. Serial No. 194,363.

*To all whom it may concern:*

Be it known that I, BENJAMIN F. SEYMOUR, a citizen of the United States, residing at Denver, in the county of Denver and State of Colorado, have invented certain new and useful Improvements in Gearing, of which the following is a specification.

My invention relates to certain new and useful improvements in gearing, by which one part is driven by another, and the invention has particular relation to the construction or formation of the teeth and bodies of intermeshing gears, as I will hereinafter describe and claim.

A leading object of the present invention is to so construct the abutting ends of the teeth of interlockable gears that all flat-surfaces are dispensed with and a mere point or edge contact is made between the gears of the driving and driven members and which point is maintained during the entire period that the teeth of one gear are riding over or along the teeth of the other gear, during the shifting of one gear relatively to the other and until the teeth of one gear become alined with the interspaces between the teeth of the other gear when driving contact between the gears is effected. This construction overcomes the tendency of the gears to "chatter" when shifting from one speed or position to another, and it relieves the gears of much of the wear and strain which heretofore have been placed on driving-gears.

In the accompanying drawings forming part of this application and in which similar letters of reference indicate like parts in the several views;

Figures 1, 2, 3, 4 and 5, illustrate plan views of single teeth of a driven and driving gear in abutting relation and showing the progressive action of the teeth of one gear along the end of the teeth of the other gear until said gears are finally brought into operative driving-connection.

Fig. 6 is a perspective view of a fragment of a gear showing a plurality of teeth with inclined end walls.

In carrying out my invention, I form the gears in the usual manner and for present purposes the part, A, may represent a single lower tooth of a driving-gear, which in practice will be suitably mounted for endwise movement, toward and from the teeth, B, of the opposing or driven-member. In practice, each of the teeth, A and B, will have its end portions tapered in converging lines toward the front face of the tooth, so as to form an inclined plane or surface, a, over which the lower teeth, A, of the driving member, which may rotate the lift, may slide gradually in shifting the teeth, A, so as to make driving contact with the teeth, B, of the driven member. In order to eliminate all abutting flat-surfaces or points of contact between the tapered ends of the teeth, A and B, of the driving and driven member respectively, I prefer that the taper or angle which is given the ends of the teeth of the opposed parts shall vary; in other words, that the angle of the end of the teeth of one part shall be greater than the angle given the adjacent surface of the companion tooth, as illustrated in Figs. 1 to 3 inclusive, since this provides an edge bearing for the teeth, A, of the shiftable gear and avoids all flats and enables the gears, A and B, to be brought into sliding contact and finally into full driving connection, as shown in Fig. 4, to the exclusion of the "chattering" and "burring" which are usually present in gears having flat-surfaces which are brought into direct engagement when the gears of the driving-member are shifted into contact with the gears of the driven member. In practice, the teeth have substantially a wedge-shape appearance in horizontal section, each end wall of a tooth tapering inwardly toward the front of the tooth, in the case of the driven member and each end wall diverging toward the front or widest portion of the tooth in the case of the driving member. The result is, therefore, that the driving member will, after the initial or abutting contact with the teeth of the driven member, slide over the inclined surface of the latter toward the front end and this movement will be progressively continued until the high point or edge on the end of the driving tooth escapes the low point on the inclined surface of the driven member, when said low point maintains its single edge contact with the declining wall or inclined surface on the end of the tooth of the driving member and continues to ride thereon until the tooth of the driving member becomes alined with the interspace between adjacent teeth of the driven member when said driving tooth may be shifted laterally into said space so that the widened faces of the driving and driven teeth will be in full driving contact, as shown in Fig. 4. During this movement of the tooth of the driving member from the position shown in Fig. 1, to that shown in Fig. 3, inclusive, the tooth of the driving member will be progressively directed toward and into the aforesaid space, and consequently when the front corner of the tooth of the driven member escapes the rear corner of the tooth of the driving member, this latter member will have been entered partly into the space between adjacent teeth of the driven member and just back of the wide rear wall thereof, so that the tooth of the driving member may be readily shot into its driving connection, as shown in Fig. 4.

The construction described is simple and results almost entirely from the cutting away of the end walls of the teeth of the driving and driven members so as to make variant inclined contact surfaces over which the teeth of the driving member may readily slide without "chattering" movement or noise, or "burring," or otherwise injuring the teeth.

The toothed construction herein described, is a division of my prior application for variable speed transmission mechanism filed September 9, 1913, Serial Number 788,837.

Having thus described my invention what I claim as new and desire to secure by Letters Patent is:

1. In gearing, the combination of driving and driven gears, each of said gears having teeth the ends of which are cut at variant angles to avoid flat surfaces of contact on entering into mesh.

2. In gearing, the combination of driving and driven gears, each of said gears having teeth with beveled ends, the bevels on the adjacent ends of laterally alined co-acting teeth being cut at differing angles whereby only narrow edges of sliding contact are provided between the surfaces of co-acting teeth and flat surfaces of contact on said teeth are avoided.

3. In gearing, the combination of driving and driven gears, each of said gears having teeth with ends diverging toward the driving faces of said teeth, the inclines on the ends of opposed teeth being at variant angles to provide substantially a narrow edge on one tooth for slidable contact along the inclined surface of the companion tooth.

In testimony whereof I affix my signature.

BENJAMIN F. SEYMOUR.